(12) United States Patent
Pai et al.

(10) Patent No.: US 11,097,299 B2
(45) Date of Patent: Aug. 24, 2021

(54) SLURRY SPRAYING MASK AND SLURRY SPRAYING JIG

(71) Applicant: Hermes Epitek Corp., Taipei (TW)

(72) Inventors: Yung-Min Pai, Taichung (TW); Pao-Chi Chi, Taoyuan (TW); Jih-Jenn Huang, HsinChu (TW)

(73) Assignee: Hermes Epitek Corp., Taipei (TW)

( * ) Notice: Subject to any disclaimer, the term of this patent is extended or adjusted under 35 U.S.C. 154(b) by 325 days.

(21) Appl. No.: 16/264,601

(22) Filed: Jan. 31, 2019

(65) Prior Publication Data
US 2019/0240691 A1    Aug. 8, 2019

(30) Foreign Application Priority Data

Feb. 6, 2018   (TW) ................................. 107104195

(51) Int. Cl.
*B05B 12/20*    (2018.01)
*B05B 15/60*    (2018.01)

(52) U.S. Cl.
CPC .............. *B05B 12/20* (2018.02); *B05B 15/60* (2018.02)

(58) Field of Classification Search
CPC ......... B05B 14/30; B05B 15/68; B05B 12/30; B05B 12/32; B05B 12/36; B05B 14/525; B05B 15/55; B05B 3/1021
See application file for complete search history.

(56) References Cited

U.S. PATENT DOCUMENTS

| | | | | | |
|---|---|---|---|---|---|
| 2,152,274 | A | * | 3/1939 | Papazian | B05B 12/122 101/114 |
| 3,275,239 | A | * | 9/1966 | Oesterle | B05B 5/0403 239/702 |
| 3,583,634 | A | * | 6/1971 | Sheetz | B05B 1/28 239/103 |
| 4,545,531 | A | * | 10/1985 | Williams | A63C 19/08 118/305 |
| 5,807,435 | A | * | 9/1998 | Poliniak | B05B 5/08 118/504 |
| 2009/0308949 | A1 | * | 12/2009 | Yamasaki | B05B 3/1021 239/223 |

(Continued)

FOREIGN PATENT DOCUMENTS

| | | |
|---|---|---|
| CN | 2745658 Y | 12/2005 |
| CN | 101484974 A | 7/2009 |
| CN | 101316663 B | 3/2012 |

(Continued)

*Primary Examiner* — Charles Capozzi
(74) *Attorney, Agent, or Firm* — CKC & Partners Co., LLC (57) ABSTRACT

A slurry spraying mask includes a holding portion and a mask portion. The holding portion includes a holding portion opening. The mask portion includes a first layer and a second layer. The first layer includes a first tapered structure, the second layer includes a second tapered structure. The first tapered structure and the second tapered structure are arranged coaxially. A gap exists between the first layer and the second layer. The apex of the first tapered structure includes a first aperture, the apex of the second tapered structure includes a second aperture, and the second aperture is overlapped with the first aperture. The apex of the second tapered structure passes through the holding portion opening such that the mask portion is localized to the holding portion.

7 Claims, 5 Drawing Sheets

(56) References Cited

U.S. PATENT DOCUMENTS

2011/0041758 A1    2/2011    An

FOREIGN PATENT DOCUMENTS

| CN | 206731390 U | 12/2017 |
|---|---|---|
| GB | 2497540 A | 6/2013 |
| JP | 2-52742 A | 2/1990 |
| TW | I411592 B | 10/2013 |
| TW | I413207 B | 10/2013 |

* cited by examiner

SLURRY SPRAYING MASK AND SLURRY SPRAYING JIG

CROSS-REFERENCE TO RELATED APPLICATION

This application claims priority to Taiwan Application Serial Number 107104195, filed Feb. 6, 2018, which is herein incorporated by reference in its entirety

BACKGROUND

Technical Field

The present disclosure relates to a slurry spraying mask and a slurry spraying jig.

Description of Related Art

Due to the increasing demand for saving power and environmental awareness, the traditional white light bulbs and tubes are gradually replaced by the bulbs and tubes made of white light emitting diode (LED). At present, the white LED on the market generates the white light mainly by emitting the blue light from blue LED dies, emitting the yellow light through illuminating the partial blue light on the yellow fluorescent powder coated on the epoxy resin, and mixing the remaining blue light and the yellow light. However, in the process of spraying the fluorescent powder, ununiform spraying often occurs. Moreover, since spraying is implemented comprehensively, the fluorescent powder is often sprayed on the unintended area, resulting in waste of the spraying slurry.

SUMMARY

Accordingly, one objective of the present disclosure is to provide a slurry spraying mask and a slurry spraying jig for solving the aforementioned problems.

In order to achieve the aforementioned objective, according to one embodiment of the present disclosure, a slurry spraying mask includes a holding portion and a mask portion. The holding portion includes a holding portion opening. The mask portion includes a first layer and a second layer. The first layer includes a first tapered structure, the second layer includes a second tapered structure. The first tapered structure and the second tapered structure are arranged coaxially. A gap exists between the first layer and the second layer. The apex of the first tapered structure includes a first aperture, the apex of the second tapered structure includes a second aperture, and the second aperture is overlapped with the first aperture. The apex of the second tapered structure passes through the holding portion opening such that the mask portion is localized to the holding portion.

In one or more embodiments of the present disclosure, the aforementioned first layer further includes a first shoulder structure connected to the bottom outer edge of the first tapered structure, and the second layer further includes a second shoulder structure connected to the bottom outer edge of the second tapered structure. The second shoulder structure includes the via hole, and the orthographic projection of the via hole on the first layer is partially located on the first tapered structure or the first shoulder structure.

In one or more embodiments of the present disclosure, the aforementioned first layer further includes a first sidewall connected to one side of the first shoulder structure away from the first tapered structure. The first sidewall includes a discharge air-bleed hole communicating with the gap for connecting to a slurry recycle device.

In one or more embodiments of the present disclosure, the aforementioned first sidewall includes a solvent feed hole communicating with the gap.

In one or more embodiments of the present disclosure, the aforementioned second layer further includes a second sidewall connected to one side of the second shoulder structure away from the second tapered structure, and the second sidewall includes a solvent feed hole communicating with the upper surface of the second layer.

In one or more embodiments of the present disclosure, the aforementioned first aperture is larger than the second aperture.

According to another embodiment of the present disclosure, a slurry spraying jig adapted for a slurry nozzle includes a frame. The frame includes a top portion and a bottom portion opposite to the top portion. The top portion includes a top opening, the bottom portion includes a bottom opening, and at least part of the orthographic projection of the top opening on the bottom portion is overlapped with the bottom opening.

In one or more embodiments of the present disclosure, the aforementioned top portion further includes a first side and a second side, the bottom portion further includes a third side corresponding to the first side and a fourth side corresponding to the second side. Each of the first side and the third side includes a plurality of holes with different heights. The aforementioned slurry spraying jig further includes a fastener. The fastener is configured to be fastened to different holes to adjust the height of the frame.

In one or more embodiments of the present disclosure, the aforementioned bottom portion further includes an accommodation space. The aforementioned slurry spraying jig further includes the aforementioned slurry spraying mask. The slurry spraying mask is detachably jointed to the accommodation space. The holding portion opening of the slurry spraying mask is overlapped with the bottom opening, and the apex of the second tapered structure faces the top opening.

In one or more embodiments of the present disclosure, the aforementioned slurry nozzle passes through the top opening to be localized to the frame.

To sum up, since the slurry spraying mask of the present disclosure includes the first tapered structure and the second tapered structure, the excess slurry overflowing through the second aperture can slide down along the gap existing between the first layer and the second layer and can be temporarily stored between the first layer and the second layer when performing the spraying process, so that the excess slurry fails to accumulate downwards on the back side of the first aperture to cause dripping and the damage to the product. Furthermore, by disposing the discharge air-bleed hole communicating with the gap in the first sidewall and connecting the discharge air-bleed hole to the slurry recycle device with the air-bleed function, the negative pressure can be generated in the gap so that the excess slurry temporarily stored between the first layer and the second layer is discharged to the slurry recycle device for storing and reusing to reduce the consumption of the slurry, and further to reduce the possibility of dripping the overflow slurry on the product.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

Figure 1:
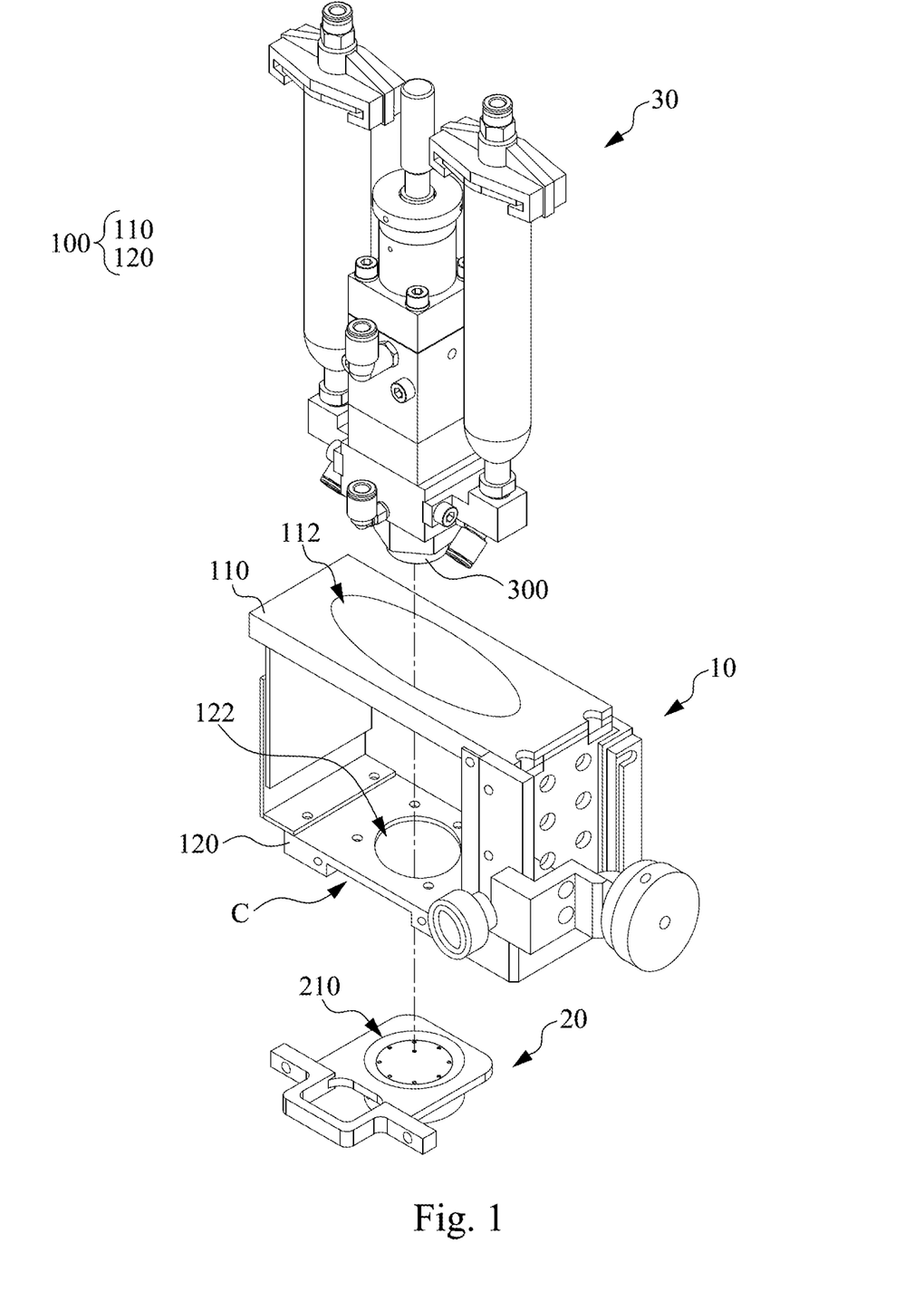
FIG. 1 is a schematic diagram of the assembly of a slurry spraying jig, a slurry spraying mask, and a slurry injector according to one embodiment of the present disclosure.

FIG. 1 is a schematic diagram of the assembly of a slurry spraying jig 10, a slurry spraying mask 20, and a slurry injector 30 according to one embodiment of the present disclosure. As shown in FIG. 1, in the present embodiment, the slurry spraying jig 10 can be adapted for the slurry nozzle 300 of the slurry injector 30. The slurry spraying jig 10 includes a frame 100. The frame 100 includes a top portion 110 and a bottom portion 120 opposite to the top portion 110. The top portion 110 includes a top opening 112, the bottom portion 120 includes a bottom opening 122, and at least part of the orthographic projection of the top opening 112 on the bottom portion 120 is overlapped with the bottom opening 122. The slurry injector 30 can be assembled on the slurry spraying jig 10 through the top opening 112. For example, the slurry nozzle 300 of the slurry injector 30 can pass through the top opening 112 to be located to the frame 100 such that the slurry injector 30 is assembled on the slurry spraying jig 10.

By this design, when intending to coat the slurry on a specific area, the bottom opening 122 can be aligned with the specific area. In this way, the slurry sprayed through the slurry nozzle 300 will pass through the bottom opening 122 and fall on the specific area, and other areas which are not exposed by the bottom opening 122 will not be sprayed with the slurry. Therefore, the effect of partial spraying can be achieved and the uniformity of spraying slurry is enhanced.

In the present embodiment, the aforementioned slurry may be, for example, fluorescent powder. However, the present disclosure is not limited thereto, and those skilled in the art can flexibly select the slurry intended to be sprayed according to actual demands. In some embodiments, the aforementioned slurry may also be an encapsulating material for an LED wafer. In some embodiments, the aforementioned slurry can be a liquid or gelatinous material.

As shown in FIG. 1, in the present embodiment, the bottom portion 120 of the slurry spraying jig 10 further includes an accommodation space C. The slurry spraying mask 20 can be assembled on the slurry spraying jig 10 through the accommodation space C. In the present embodiment, the slurry spraying mask 20 is detachably jointed to the accommodation space C. For example, the slurry spraying mask 20 can be fixed in the accommodation space C by screwing. However, the present disclosure is not limited thereto, and those skilled in the art can flexibly select the method to fix the slurry spraying mask 20 on the slurry spraying jig 10 according to actual demands.

Figure 2:
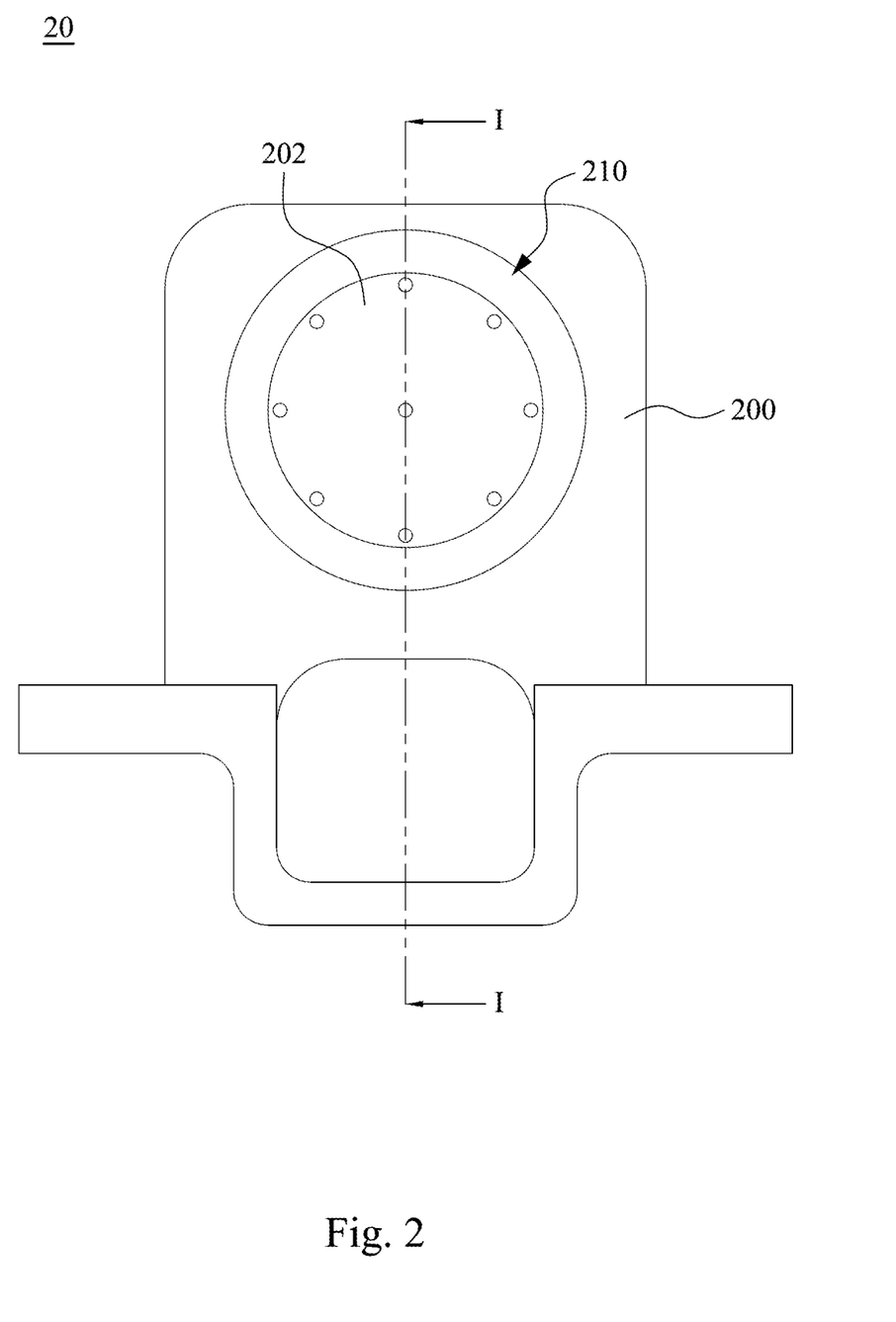
FIG. 2 is a top view of the slurry spraying mask of FIG. 1.
Figure 3:
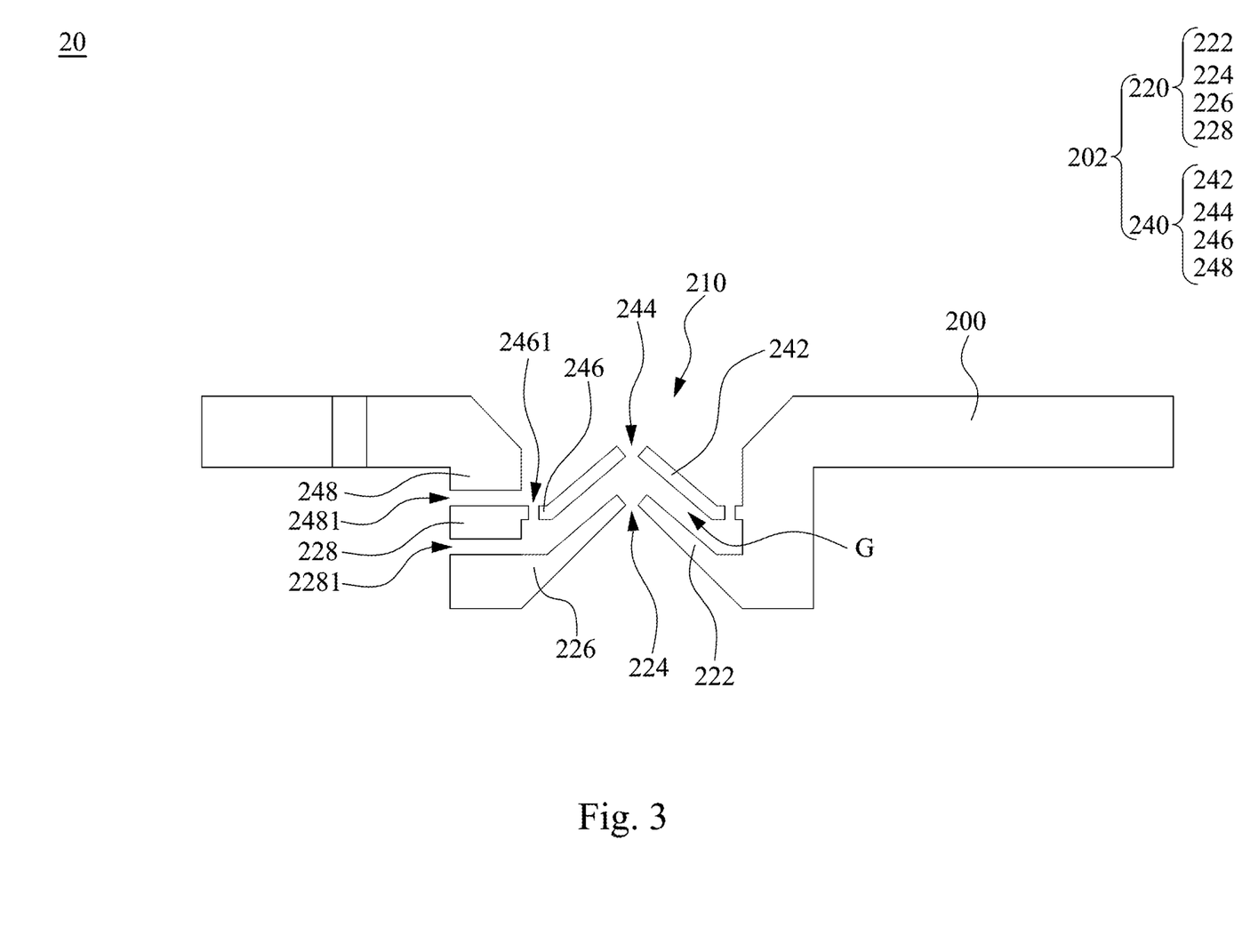
FIG. 3 is a cross-sectional view taken along the line I-I of FIG. 2.

FIG. 2 is a top view of the slurry spraying mask 20 of FIG. 1. FIG. 3 is a cross-sectional view taken along the line I-I of FIG. 2. As shown in FIG. 2 and FIG. 3, in the present embodiment, the slurry spraying mask 20 includes a holding portion 200 and a mask portion 202. The holding portion 200 includes a holding portion opening 210. The mask portion 202 includes a first layer 220 and a second layer 240. The first layer 220 includes a first tapered structure 222, and the second layer 240 includes a second tapered structure 242. The first tapered structure 222 and the second tapered structure 242 are arranged coaxially, and a gap G exists between the first layer 220 and the second layer 240. The apex of the first tapered structure 222 includes a first aperture 224, and the apex of the second tapered structure 242 includes a second aperture 244. The second aperture 244 is overlapped with the first aperture 224, and the apex of the second tapered structure 242 passes through the holding portion opening 210 such that the mask portion 202 is locatlized to the holding portion 200. In some embodiments, the first aperture 224 is larger than the second aperture 244. In some embodiments, the mask portion 202 can be a non-metallic material, such as a resin material.

In the present embodiment, the first layer 220 further includes a first shoulder structure 226 connected to the bottom outer edge of the first tapered structure 222, and the second layer 240 further includes a second shoulder structure 246 connected to the bottom outer edge of the second tapered structure 242. The second shoulder structure 246 includes at least one via hole 2461, and the orthographic projection of the via hole 2461 on the first layer 220 is partially located on the first tapered structure 222 or the first shoulder structure 226.

In the present embodiment, the first layer 220 further includes a first sidewall 228 connected to one side of the first shoulder structure 226 away from the first tapered structure 222. The first sidewall 228 includes a discharge air-bleed hole 2281 communicating with the gap G for connecting to a slurry recycle device.

Please refer to FIG. 1 to FIG. 3 at the same time. When intending to coat the slurry on a specific region, not only does the slurry injector 30 be assembled on the slurry spraying jig 10, but also the slurry spraying mask 20 can also be assembled on the slurry spraying jig 10 in the present embodiment. For example, while assembling, the holding portion opening 210 of the slurry spraying mask 20 is able to be overlapped with the bottom opening 122 of the slurry spraying jig 10 and the apex of the second tapered structure 242 faces the top opening 112 of the slurry spraying jig 10, such that the slurry nozzle 300 of the slurry injector 30 is aligned with the second tapered structure 242.

Next, when spraying the slurry, the slurry spraying mask 20 can be aligned with the specific area intended to be sprayed. In this way, the slurry sprayed from the slurry nozzle 300 will fall on the specific area after sequentially passing through the first aperture 224 of the first tapered structure 222 and the second aperture 244 of the second tapered structure 242. By the configurations of the first aperture 224 and the second aperture 244, the area of spraying can be limited, so that the position of spraying can be more precise. In particular, when it is necessary to compensate the slurry on the partial area of the product, the effect of partial spraying and the uniformity of spraying slurry can be further enhanced.

Moreover, comparing with the conventional planar mask, which tends to cause accumulation and dripping of the excess slurry on the back side of the mask to damage the product, since the slurry spraying mask 20 of the present disclosure includes the first tapered structure 222 and the second tapered structure 242, the excess slurry overflowing through the second aperture 244 can slide down along the gap G existing between the first layer 220 and the second layer 240 and is temporarily stored between the first layer 220 and the second layer 240 when performing the spraying process, so that the excess slurry fails to accumulate downwards on the back side of the first aperture 224 to cause dripping and the damage to the product. Furthermore, by disposing the discharge air-bleed hole 2281 communicating with the gap G in the first sidewall 228 and connecting the discharge air-bleed hole 2281 to the slurry recycle device with the air-bleed function, the negative pressure can be generated in the gap G, so that the excess slurry temporarily stored between the first layer 220 and the second layer 240 is discharged to the slurry recycle device for storing and reusing to reduce the consumption of the slurry, and further to reduce the possibility of dripping the overflow slurry on the product.

In addition, the excess slurry deposited on the upper surface of the second layer 240 can also be slid down between the first layer 220 and the second layer 240 through the via hole 2461 included in the second shoulder structure 246, and be recycled into the slurry recycle device by the foregoing method, to further increase the recycle efficiency of the overflow slurry and reduce waste of materials.

Moreover, since the slurry spraying mask 20 is detachably jointed the accommodation space C, the slurry spraying mask 20 is easy to be replaced and convenient to clean when the slurry spraying mask 20 is dirty.

Please refer to FIG. 3 again. In the present embodiment, the second layer 240 further includes a second sidewall 248 connected to one side of the second shoulder structure 246 away from the second tapered structure 242, and the second sidewall 248 includes a solvent feed hole 2481 communicating with the upper surface of the second layer 240.

When the sprayed slurry has the characteristic of easy-dry, such as the fluorescent powder material, it causes the fluidity of the slurry to become worse and the accumulation condition to become severe. Therefore, in order to maintain the wettability and fluidity of the slurry, the solvent for diluting the slurry can be added through the solvent feed hole 2481 so that the slurry can smoothly slide down to the discharge air-bleed hole 2281 to enhance the recycle efficiency of the overflow slurry and reduce waste of materials. At the same time, since the solvent can maintain the fluidity of the slurry, it helps to improve the condition of depositing the slurry on the mask portion 202, and keep the mask portion 202 clean.

Figure 4:
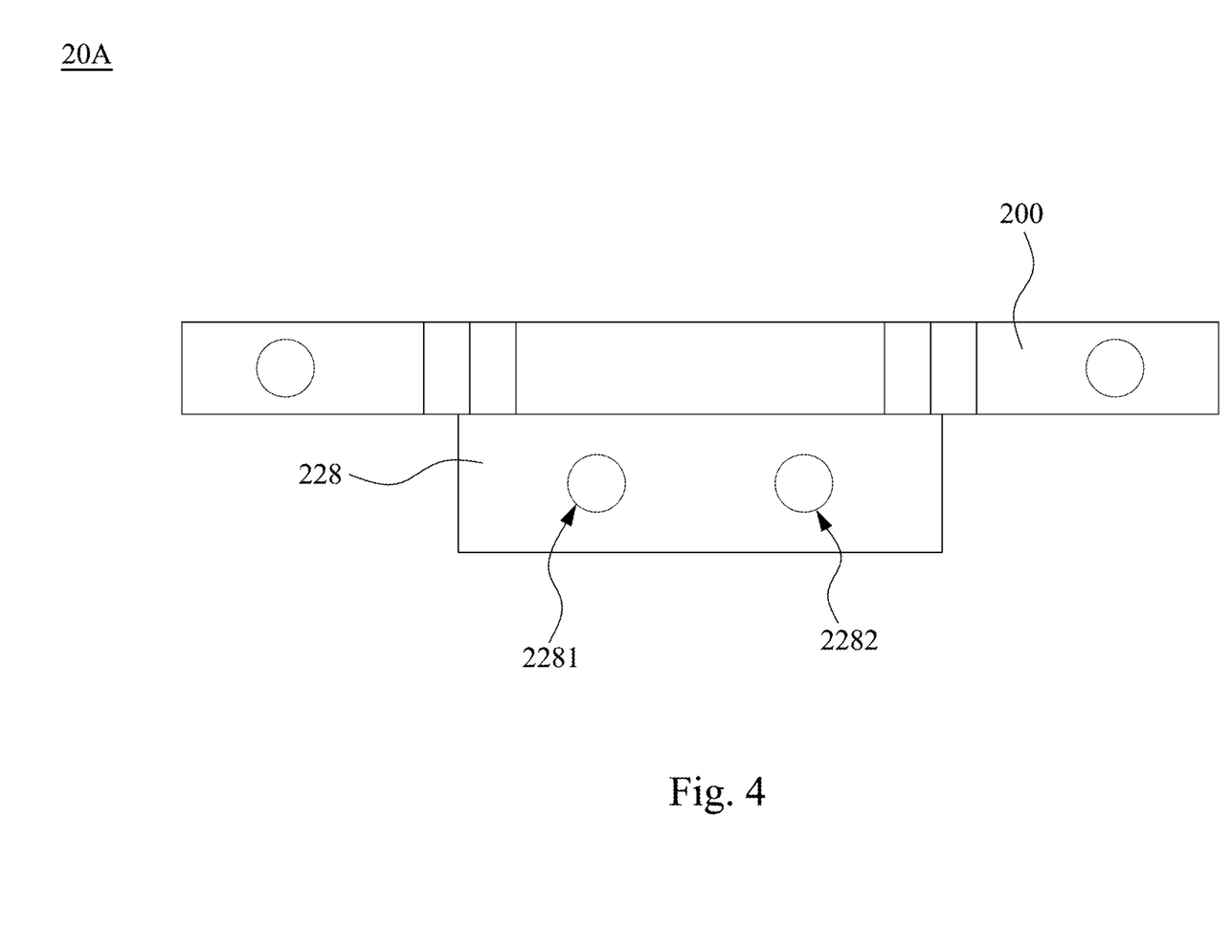
FIG. 4 is a front view of a slurry spraying mask according to another embodiment of the present disclosure.

FIG. 4 is a front view of a slurry spraying mask 20A according to another embodiment of the present disclosure. The slurry spraying mask 20A of the present embodiment is similar to the aforementioned slurry spraying mask 20, and the difference is that the solvent feed hole 2282 is disposed in the first sidewall 228 in the present embodiment.

As shown in FIG. 4, the first sidewall 228 includes a solvent feed hole 2282 communicating with the gap G, the solvent for diluting the slurry can enter through the solvent feed hole 2282 and contact the slurry temporarily stored in the interlayer such that the slurry is diluted and exhausted from the discharge air-bleed hole 2281. In the present embodiment, the discharge air-bleed hole 2281 and the solvent feed hole 2282 in the first sidewall 228 can be disposed, for example, on the left and right sides, but the present disclosure is not limited thereto. In some embodiments, the location of the solvent feed hole 2282 can be slightly higher than the location of the discharge air-bleed hole 2281. In some embodiments, the first sidewall 228 may be provided with a baffle in the gap G for partially separating the discharge air-bleed hole 2281 and the solvent feed hole 2282, to allow the solvent for diluting the slurry to be sufficiently mixed with the slurry temporarily stored in the interlayer rather than to be exhausted from the discharge air-bleed hole 2281 directly.

Figure 5:
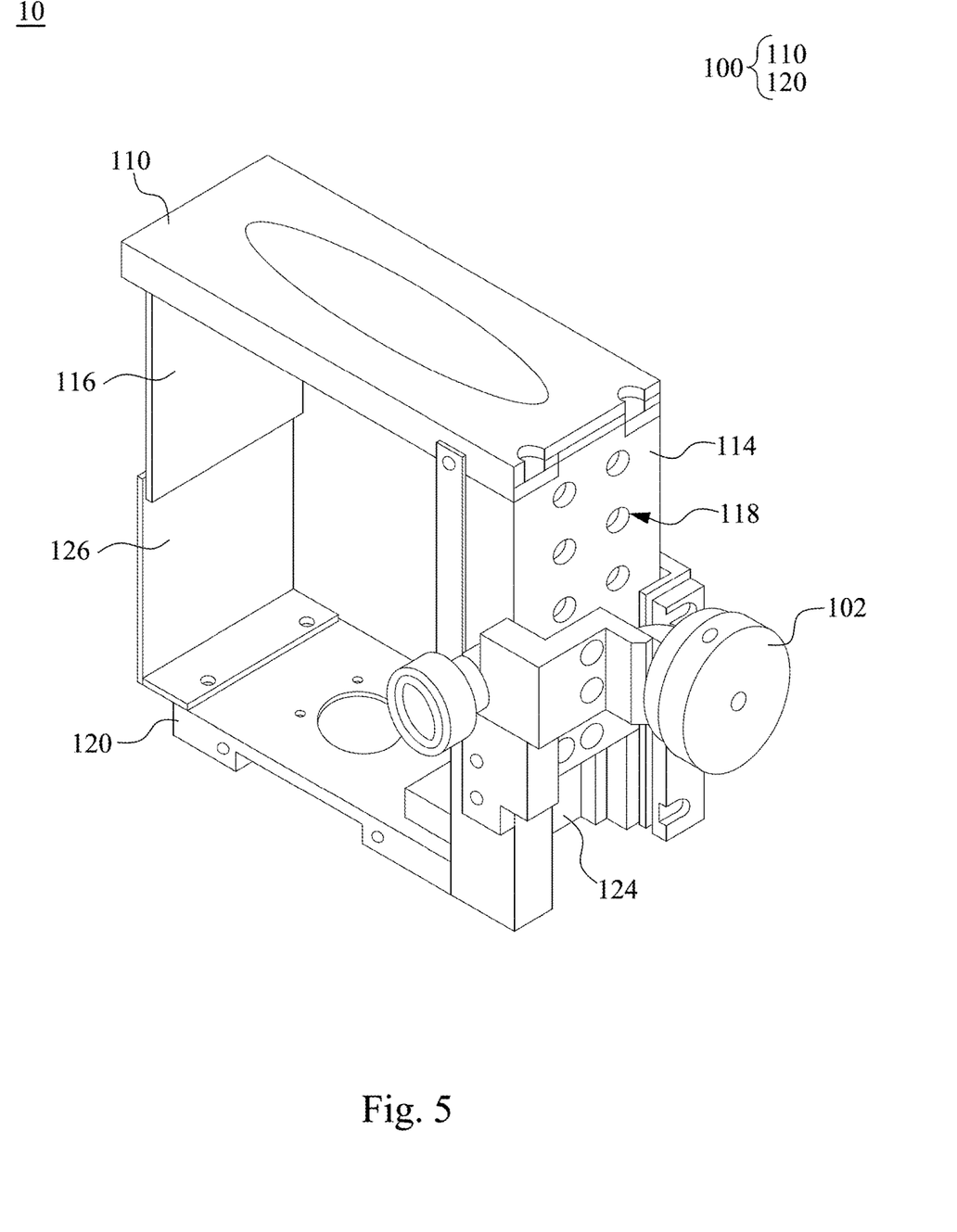
FIG. 5 is a schematic diagram of the slurry spraying jig of FIG. 1 of which the height is adjusted.

FIG. 5 is a schematic diagram of the slurry spraying jig 10 of FIG. 1 of which the height is adjusted. In the present embodiment, the top portion 110 of the slurry spraying jig 10 further includes a first side 114 and an opposite second side 116, and the bottom portion 120 further includes a third side 124 corresponding to the first side 114 and a fourth side 126 corresponding to the second side 116. Each of the first side 114 and the third side 124 includes a plurality of holes 118 with different heights. The slurry spraying jig 10 further includes at least one fastener 102, such as a screw and a nut. The fastener 102 is fastened to the hole 118 to fix the top portion 110 to the bottom portion 120. The present disclosure can adjust the relative position between the top portion 110 and the bottom portion 120 by fastening the fastener 102 to the holes 118 with different height, so as to change the height of the frame 100.

In this way, the slurry spraying jig 10 can adjust the height of the frame 100 according to different slurry nozzles or spray taper angles to enhance the adaptability of the slurry spraying jig 10.

From the above detailed description of the embodiments of the present disclosure, it can be clearly seen that, since the slurry spraying mask of the present disclosure includes the first tapered structure and the second tapered structure, the excess slurry overflowing through the second aperture can slide down along the gap existing between the first layer and the second layer and be temporarily stored between the first layer and the second layer when performing the spraying process, so that the excess slurry fails to accumulate downwards on the back side of the first aperture to cause dripping and the damage to the product. Furthermore, by disposing the discharge air-bleed hole communicating with the gap in the first sidewall and connecting the discharge air-bleed hole to the slurry recycle device with the air-bleed function, the negative pressure can be generated in the gap so that the excess slurry temporarily stored between the first layer and the second layer is discharged to the slurry recycle device for storing and reusing to reduce the consumption of the slurry, and further to reduce the possibility of dripping the overflow slurry on the product.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A slurry spraying mask, comprising:
a holding portion comprising a holding portion opening; and
a mask portion comprising a first layer and a second layer, wherein the first layer comprises a first tapered structure, the second layer comprises a second tapered structure, the first tapered structure and the second tapered structure are arranged coaxially, a gap exists between the first layer and the second layer, an apex of the first tapered structure comprises a first aperture, an apex of the second tapered structure comprises a second aperture, the second aperture is overlapped with the first aperture, and the apex of the second tapered structure passes through the holding portion opening such that the mask portion is localized to the holding portion,
wherein the first layer further comprises a first shoulder structure connected to a bottom outer edge of the first tapered structure, the second layer further comprises a second shoulder structure connected to a bottom outer edge of the second tapered structure, the second shoulder structure comprises at least one via hole, and an orthographic projection of the at least one via hole on the first layer is partially located on the first tapered structure or the first shoulder structure,
wherein the first layer further comprises a first sidewall connected to one side of the first shoulder structure away from the first tapered structure, the first sidewall comprises a discharge air-bleed hole communicating with the gap for connecting to a slurry container.

2. The slurry spraying mask of claim 1, wherein the first sidewall comprises a solvent feed hole communicating with the gap.

3. The slurry spraying mask of claim 1, wherein the second layer further comprises a second sidewall connected to one side of the second shoulder structure away from the second tapered structure, and the second sidewall connected to the second shoulder structure comprises a solvent feed hole communicating with an upper surface of the second layer.

4. The slurry spraying mask of claim 1, wherein the first aperture is larger than the second aperture.

5. A slurry spraying jig adapted for a slurry nozzle, comprising:
a frame comprising a top portion and a bottom portion opposite to the top portion, wherein the top portion comprises a top opening, the bottom portion comprises a bottom opening, and at least part of an orthographic projection of the top opening on the bottom portion is overlapped with the bottom opening, wherein the bottom portion further comprises an accommodation space; and
a slurry spraying mask, comprising:
a holding portion comprising a holding portion opening; and
a mask portion comprising a first layer and a second layer, wherein the first layer comprises a first tapered structure, the second layer comprises a second tapered structure, the first tapered structure and the second tapered structure are arranged coaxially, a gap exists between the first layer and the second layer, an apex of the first tapered structure comprises a first aperture, an apex of the second tapered structure comprises a second aperture, the second aperture is overlapped with the first aperture, and the apex of the second tapered structure passes through the holding portion opening such that the mask portion is localized to the holding portion,
wherein the slurry spraying mask detachably jointed to the accommodation space, the holding portion opening of the slurry spraying mask being overlapped with the bottom opening, and the apex of the second tapered structure facing the top opening.

6. The slurry spraying jig of claim 5, wherein the top portion further comprises a first side and a second side, the bottom portion further comprises a third side corresponding to the first side and a fourth side corresponding to the second side, each of the first side and the third side comprises a plurality of holes with different heights;
the slurry spraying jig further comprises:
at least one fastener for being fastened to different holes to adjust the height of the frame.

7. The slurry spraying jig of claim 5, wherein the slurry nozzle passes through the top opening to be localized to the frame.

* * * * *